March 7, 1967　　　J. A. SCOTT　　　3,308,179
PROCESS FOR DEHYDROGENATION OF ETHYLBENZENE
Filed Jan. 31, 1964
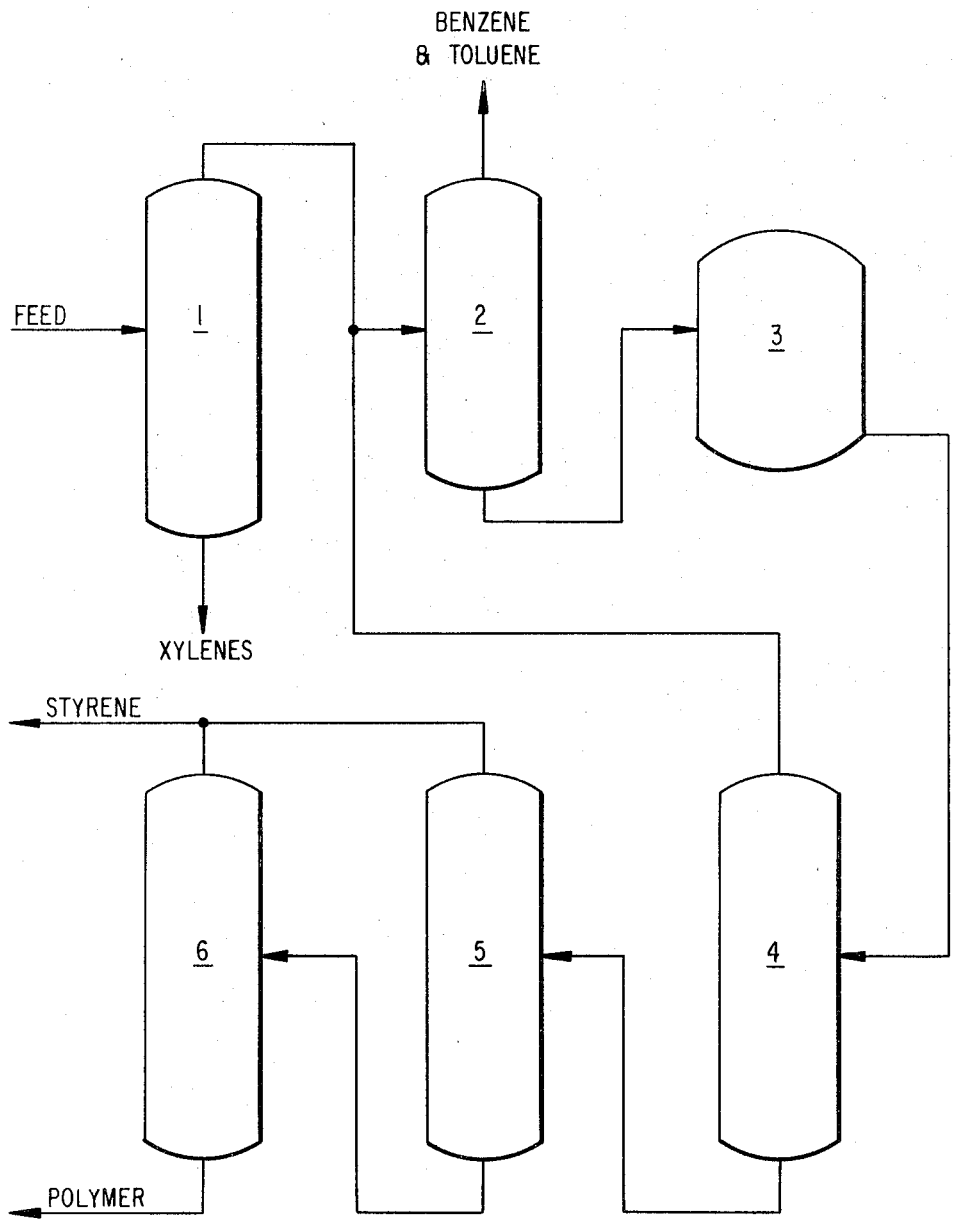
INVENTOR.
JOHN A. SCOTT
BY
McLean & Boustead
ATTORNEYS United States Patent Office 3,308,179
Patented Mar. 7, 1967

3,308,179
PROCESS FOR DEHYDROGENATION OF ETHYLBENZENE
John A. Scott, New York, N.Y., assignor, by mesne assignments, to Sinclair Research, Inc., New York, N.Y., a corporation of Delaware
Filed Jan. 31, 1964, Ser. No. 341,535
7 Claims. (Cl. 260—669)

This invention relates to the production of high purity styrene by dehydrogenation in a system into which is fed a relatively impure ethylbenzene stream. According to the process of this invention, high purity styrene, for instance, having a purity of at least 99 weight percent or even at least 99.5%, based on $C_8$ aromatic hydrocarbons is produced in a catalytic dehydrogenation process using an ethylbenzene feedstock of a purity of 95 to 98.5 weight percent, preferably 96 to 97.5%.

The catalytic dehydrogenation of ethylbenzene to form styrene is well known in the art. For polymerization grade styrene, a purity of at least 99.5% is usually required. Styrene containing more than about 1% of a stable hydrocarbon boiling in the $C_8$ aromatics range is generally useless for normal commercial polymer purposes. Thus in the production of commercial styrene, it is very important to prevent the presence of impurities in the product. Normally the styrene-containing effluent which has been formed by dehydrogenation of feeds prepared by separation from petroleum fractions, contains both ethylbenzene as a result of incomplete dehydrogenation and xylene impurities. The ethylbenzene and xylene are normally removed overhead from the styrene product bottoms and the overhead is recycled to the dehydrogenation reactor. Thus it was considered that the making of a styrene product of given concentration permitted the presence of xylene in the feed only to the same extent since any xylene in the ethylbenzene feed would build up in the recycle stream until equilibrium is established and at this point, the amount of xylene which goes into the styrene product is equal to the amount of xylene entering as an impurity in the ethylbenzene feed. Therefore it has been considered necessary to use an ethylbenzene feed of extremely high purity, normally greater than 99.5%. See U.S. Patents Nos. 2,959,626 and 3,084,108.

The object of this invention is to prepare high purity styrene using as a starting material ethylbenzene of relatively lower purity. The object of this invention is further to make it possible to produce high purity styrene by the use of less expensive ethylbenzene feed distillation systems than heretofore required or to increase the capacity of existing systems for obtaining the ethylbenzene feed stream from aromatic petroleum fractions. For example, the amount of ethylbenzene available for dehydrogenation, and thus the amount of styrene produced may be increased by about 21% when the ethylbenzene fed to the dehydrogenation system is only 97% pure, rather than 99.5%, based on total $C_8$ hydrocarbons.

The process of this invention is based upon the discovery that in the system of the present invention sufficient amounts of xylenes are cracked in the dehydrogenation reactor to lower boiling impurities such as benzene and toluene. As a practical matter, all xylenes are not removed from the styrene product. Thus the amount of xylenes cracked plus the amount of xylene in the styrene product is essentially equal to the amount of xylene entering in the ethylbenzene feed, and accordingly the amount of xylenes cracked is essentially equal to the amount of xylene in the $C_8$ aromatic hydrocarbon feed stream minus the xylene in the styrene product.

In the process for purification of the ethylbenzene feedstock, two distillation columns are often employed. The first separates the bulk of the higher boiling xylenes from ethylbenzene and the second removes the lower boiling benzene and toluene from the ethylbenzene. This sequence can be reversed; however, by removing the benzene and toluene first. A common column may be employed for distilling benzene and toluene from the feedstock and from the $C_8$ stream being recycled in the dehydrogenation system. In any event, according to this invention, the ethylbenzene feed to the dehydrogenation system contains 95 to 98.5%, preferably 96 to 97.5%, ethylbenzene based on the total of ethylbenzene and xylenes.

After separation, the ethylbenzene is catalytically dehydrogenated. Generally the dehydrogenation temperature should be in the range of about 1000 to 1200° F. and preferably about 1050 to 1175° F. Any suitable ethylbenzene dehydrogenation catalyst may be used. Typical dehydrogenation catalysts are commercially available catalysts which comprise 90% $Fe_2O_3$, 4% $Cr_2O_3$ and 6% $K_2CO_3$; or 62.5% $Fe_2O_3$, 2.2% $Cr_2O_3$ and 35.3% $K_2CO_3$. Other suitable catalyst compositions are as follows: 60–95% iron oxide, 4–39% potassium oxide and 1–10% chromium oxide; 5–60% cobalt oxide, 10–60% iron oxide, 4–39% potassium oxide and 1–10% chromium oxide and 50–90% iron oxide, 9–49% calcium oxide and 1–4% chromium oxide. These catalysts often consist essentially of the oxides of an iron group metal; an alkaline metal including the alkali and alkaline earth metals and chromium. The oxide form of the metals includes compounds that decompose to an oxide under the reaction or similar conditions.

The dehydrogenation may be carried out at atmospheric or elevated or reduced pressures. With pressures in the range of about 200 p.s.i.g. the hydrocarbon feed is often diluted with from about 1 to 10 volumes of steam to reduce the hydrocarbon partial pressure. The space velocity can be varied and when using a catalyst the WHSV (pounds hydrocarbon per pound of catalyst per hour) may often vary from about 0.1 to 5, preferably from 0.4 to 0.7. In general, standard dehydrogenation reactor conditions have been found satisfactory.

It has been found that the amount of xylenes cracked increases with increasing ethylbenzene conversion, and it is usually only necessary to keep the conversion of ethylbenzene high enough so that the amount of xylene cracked is about equal to the amount in the feed minus that in the styrene product. In general, the ethylbenzene conversion will be in the range of about 25 to 70%, preferably about 30 to 60%. It is desirable that the distillation column for separating the recycle stream be capable of separating xylene and ethylbenzene from styrene without a large amount of styrene going to the recycle stream in order to avoid undue polymerization of the styrene in the dehydrogenation reactor. Generally, the column should be capable of making a separation which yields a styrene product of at least 99% or even at least 99.5% purity, and preferably the column will give this product and a recycle stream of less than about 3%, preferably less than 1% styrene based on $C_8$ aromatics when distilling the product resulting from the dehydrogenation at about 33% ethylbenzene conversion. Such a column was used in the examples which follow. Operation according to the process of this invention results in an increased ethylbenzene feed purification column capacity of 21% when 97% rather than 99.5% ethylbenzene is used, and at the same dehydrogenation conversion level gives 21% more styrene.

The process can be more readily understood by reference to the figure showing a flow sheet of the process.

Crude ethylbenzene feed enters the primary tower 1 and is purified by removing xylenes as the bottom product and taking off ethylbenzene, xylene and lighter materials overhead. This overhead is joined with the recycle stream from the dehydrogenation system and the combined material is passed into distillation column 2. In column 2, benzene and toluene are removed overhead and ethylbenzene and xylenes are taken as a bottom product. As an alternative mode of operation, the ethylbenzene and xylene from column 1 may by-pass the benzene-toluene separation column 2 and go directly to dehydrogenation reactor 3, especially if the overhead from column 1 is essentially devoid of benzene and toluene. The bottom product from column 2 enters the dehydrogenation reactor 3 wherein ethylbenzene is converted to styrene. The dehydrogenation reactor effluent is separated in recycle distillation column 4. The high purity styrene product is recovered as the bottom product from column 4 and the overhead stream containing styrene, xylene, ethylbenzene, benzene and toluene is recycled to column 2.

Purification of the styrene may take place in the continuous finishing distillation tower 5 which has a highly pure styrene overhead product and a styrene and polystyrene bottoms product and batch finishing column 6, which has a styrene overhead product and a polymer bottoms product.

The following examples illustrate the process of this invention.

Example I

An ethylbenzene feed was converted to styrene in equipment of the type described. Crude ethylbenzene feed was first separated from xylene to give a feed containing 2% xylene, based on $C_8$ aromatics. Benzene and toluene impurities were removed in a second distillation. The bottoms products from the benzene-toluene column were then sent to a dehydrogenation reactor containing a dehydrogenation catalyst containing approximately 90% $Fe_2O_3$, 4% $Cr_2O_3$, and 6% $K_2CO_3$, and from there to a recycle column which removed xylene, ethylbenzene, benzene and toluene impurities from the styrene and recycled them to the benzene-toluene column. Flow rates, stream compositions, and reactor compositions for this run are shown in Table I.

TABLE I

| Composition | Flow Rates (Parts by Weight/Hr.) | | | | | |
|---|---|---|---|---|---|---|
| | Ethylbenzene Feed To B-T Twr. 2 | Recycle and Liquid From Vent Condenser To B-T Twr. 2 | Benzene-Toluene Tower 2 | | | Vent Gas From Dehydrogenation |
| | | | Feed | OVHD To Refinery | Bottoms To Reactor | |
| $H_2$ | | | | | | 5.67 |
| $C_1$ | | | | | | 1.03 |
| $C_2$ | | | | | | 0.82 |
| $C_3+$ | | | | | | 0.11 |
| $CO_2$ | | | | | | 10.27 |
| Paraffin | 0.52 | 1.68 | 2.20 | 0.15 | 2.05 | |
| Benzene | | 6.52 | 6.52 | 6.52 | | |
| Toluene | 13.38 | 15.61 | 28.99 | 23.39 | 5.60 | |
| Ethylbenzene | 163.30 | 146.07 | 309.37 | 4.24 | 305.13 | |
| M-P Xylene | 3.80 | 34.15 | 37.95 | 0.29 | 37.66 | |
| Styrene | | 15.56 | 15.56 | | 15.56 | |
| Polymer | | | | | | |
| Total | 181.00 | 219.59 | 400.59 | 34.59 | 366.00 | [1] 17.90 |

| Composition | Flow Rates (Parts by Weight/Hr.) | | | | | |
|---|---|---|---|---|---|---|
| | Recycle Tower 4 | | | | Finishing Tower 5 | |
| | Feed | OVHD Vapor To B-T Twr. 2 Via Vent Cond. | OVHD Liquid To B-T Twr. 2 | Bottoms To Finishing Tower 5 | OVHD Product | Bottoms To Batch Still 6 |
| $H_2$ | | | | | | |
| $C_1$ | | | | | | |
| $C_2$ | 0.14 | | | | | |
| $C_3+$ | | | | | | |
| $CO_2$ | | | | | | |
| Paraffin | 1.68 | 0.41 | 1.08 | | | |
| Benzene | 6.52 | 3.80 | 1.95 | | | |
| Toluene | 15.61 | 6.74 | 9.97 | | | |
| Ethylbenzene | 146.17 | 30.00 | 116.39 | 0.10 | 0.10 | |
| M-P Xylene | 34.72 | 6.62 | 27.06 | 0.57 | 0.57 | |
| Styrene | 150.41 | 2.43 | 13.14 | 134.85 | 133.60 | 1.25 |
| Polymer | 1.25 | | | 1.25 | | 1.25 |
| Total | 356.50 | 50.00 | 169.59 | 136.77 | 134.27 | 2.50 |

| Reactor Conditions | | Reactor Feed Composition | Weight Percent |
|---|---|---|---|
| Fresh Feed (parts/hr.) | 168 | Paraffins | 0.56 |
| Recycle (parts/hr.) | 198 | Toluene | 1.53 |
| Total Reactor Feed (parts/hr.) | 366 | Ethylbenzene | 83.37 |
| Total Steam to Reactor (parts/hr.) | 830 | M-P Xylenes | 10.29 |
| Steam Temp., °F | 1,400 | Styrene | 4.25 |
| Reactor Inlet, °F | 1,140 | | |
| Reactor Outlet, °F | 1,090 | Total | 100.00 |
| Conversion Per Pass, Mole percent | 45 | | |
| Weight Hourly Space Velocity, #/H HC/# Cat | 0.56 | | |

[1] 8.40 parts of the vent gas are products of the water gas reaction.

Example II

The process of Example I was repeated using an ethylbenzene feed containing 4% xylene based on $C_8$ aromatics. Flow rates and conditions are shown in Table II.

reaction as said recycle stream, the conversion of ethylbenzene in said reaction being about 25 to 70% and sufficient to crack xylenes to lower boiling materials in an amount essentially equal to the amount of xylene in the $C_8$ aromatic hydrocarbon feed stream minus the xylene in the high purity styrene product.

TABLE II

| Composition | Flow Rates (Parts by Weight/Hr.) | | | | |
|---|---|---|---|---|---|
| | Ethylbenzene Feed To B-T Twr. 2 | Recycle and Liquid From Vent Condenser To B-T Twr. 2 | Benzene-Toluene Tower 2 | | Vent Gas From Dehydrogenation |
| | | | Feed | OVHD To Refinery | Bottoms To Reactor | |
| $H_2$ | | | | | | 5.51 |
| $C_1$ | | | | | | 1.16 |
| $C_2$ | | | | | | 0.81 |
| $C_3+$ | | | | | | 0.16 |
| $CO_2$ | | | | | | 12.26 |
| Paraffin | 1.31 | 2.02 | 3.33 | 0.88 | 2.44 | |
| Benzene | | 7.76 | 7.76 | 7.76 | | |
| Toluene | 10.00 | 21.63 | 31.63 | 24.51 | 7.92 | |
| Ethylbenzene | 171.70 | 133.35 | 305.05 | .50 | 304.55 | |
| M-P Xylene | 6.99 | 57.80 | 64.79 | 0.03 | 62.83 | |
| Styrene | | 28.16 | 28.16 | | 28.16 | |
| Polymer | | | | | | |
| Total | 190.00 | 250.00 | 440.00 | 33.68 | 405.9 | [1] 19.90 |

| Composition | Flow Rates (Parts by Weight/Hr.) | | | | | |
|---|---|---|---|---|---|---|
| | Recycle Tower 4 | | | | Finishing Tower 5 | |
| | Feed | OVHD Vapor To B-T Twr. 2 Via Vent Cond. | OVHD Liquid To B-T Twr. 2 | Bottoms To Finishing Tower 5 | OVHD Product | Bottoms To Batch Still 6 |
| $H_2$ | | | | | | |
| $C_1$ | | | | | | |
| $C_2$ | | 0.20 | | | | |
| $C_3+$ | | | | | | |
| $CO_2$ | | | | | | |
| Paraffin | 2.02 | 0.53 | 1.64 | | | |
| Benzene | 7.76 | 3.98 | 2.48 | | | |
| Toluene | 21.63 | 7.50 | 12.26 | | | |
| Ethylbenzene | 133.35 | 25.25 | 113.36 | 0.10 | 0.10 | |
| M-P Xylene | 57.80 | 9.00 | 45.58 | 0.63 | 0.63 | |
| Styrene | 171.45 | 3.74 | 24.68 | 143.29 | 141.53 | 1.76 |
| Polymer | 1.94 | | | 1.94 | | 1.94 |
| Total | 396.15 | 50.00 | 200.00 | 145.96 | 142.26 | 3.70 |

| Reactor Conditions | | Reactor Feed Composition | Weight percent |
|---|---|---|---|
| Fresh Feed (parts/hr.) | 184 | Paraffins | 0.60 |
| Recycle (parts/hr.) | 222 | Toluene | 1.95 |
| Total Reactor Feed (parts/hr.) | 406 | Ethylbenzene | 75.03 |
| Total Steam to Reactor (parts/hr.) | 909 | M-P Xylenes | 15.48 |
| Steam Temp., °F | 1,398 | Styrene | 6.94 |
| Reactor Inlet, °F | 1,165 | | |
| Reactor Outlet, °F | 1,112 | Total | 100.00 |
| Conversion Per Pass, Mole percent | 47.9 | | |
| Weight Hourly Space Velocity, #/H HC/# Cat | 0.62 | | |

[1] 10.15 parts/hr. of the vent gas are products of the water gas reaction.

It is claimed:

1. In the process of producing styrene of at least 99% purity based on $C_8$ aromatic hydrocarbons from a $C_8$ aromatic hydrocarbon feed stream consisting essentially of xylene and 95 to 98.5% ethylbenzene based on the $C_8$ aromatics which consists essentially of combining said $C_8$ aromatic hydrocarbon with a $C_8$ aromatic recycle stream, dehydrogenating said combined $C_8$ material at a temperature of about 1000 to 1200° F. to produce styrene by dehydrogenation of ethylbenzene, removing the high purity styrene product from the reaction effluent and recycling remaining $C_8$ aromatic effluent to the dehydrogenation reaction as said recycle stream, the conversion of ethylbenzene in said reaction being about 25 to 70% and sufficient to crack xylenes to lower boiling materials in an amount essentially equal to the amount of xylene in the $C_8$ aromatic hydrocarbon feed stream minus the xylene in the high purity styrene product.

2. The method of claim 1 wherein the ethylbenzene conversion is about 30 to 60% and the styrene product is at least 99.5% pure based on $C_8$ aromatic hydrocarbons.

3. The method of claim 2 wherein the recycle stream is separated from the styrene product in a distillation column which gives a recycle stream of less than 3% styrene when distilling the product stream resulting from the dehydrogenation at about 33% ethylbenzene conversion.

4. The process of claim 3 wherein the dehydrogenation is at a temperature of about 1050 to 1175° C.

5. The method of claim 2 wherein the dehydrogenation is conducted in the presence of a catalytic amount of a catalyst consisting essentially of $Fe_2O_3$, $Cr_2O_3$ and $K_2CO_3$.

6. The process of claim 5 wherein the $C_8$ aromatic hydrocarbon feed contains 96 to 97.5% ethylbenzene based on $C_8$ aromatics.

7. The method of claim 1 wherein said xylene comprises a mixture of meta and para xylenes.

References Cited by the Examiner
UNITED STATES PATENTS

| | | | |
|---|---|---|---|
| 2,376,709 | 5/1945 | Mattox | 260—669 |
| 2,963,518 | 12/1960 | Amos et al. | 260—672 |
| 3,093,694 | 6/1963 | Soderquist et al. | 260—669 |

DELBERT E. GANTZ, *Primary Examiner.*

C. R. DAVIS, *Assistant Examiner.*

UNITED STATES PATENT OFFICE
CERTIFICATE OF CORRECTION

Patent No. 3,308,179　　　　　　　　　　　　　　　　March 7, 1967

John A. Scott

It is hereby certified that error appears in the above numbered patent requiring correction and that the said Letters Patent should read as corrected below.

Column 6, line 75, for "1175° C." read -- 1175° F. --.

Signed and sealed this 7th day of November 1967.

(SEAL)
Attest:

Edward M. Fletcher, Jr.　　　　　　　　　　　　　　　EDWARD J. BRENNER
Attesting Officer　　　　　　　　　　　　　　　　　　Commissioner of Patents